United States Patent [19]

Yatsuka

[11] Patent Number: 5,750,248
[45] Date of Patent: May 12, 1998

[54] MAGNETIC RECORDING MEDIUM PREPARED FROM A SPECIFIED MAGNETIC PAINT

[75] Inventor: Takeshi Yatsuka, Ohtsu, Japan

[73] Assignee: Toyo Boseki Kabushiki Kaisha, Osaka, Japan

[21] Appl. No.: 608,602

[22] Filed: Feb. 29, 1996

[30] Foreign Application Priority Data

Mar. 3, 1995 [JP] Japan ................................. 7-044356

[51] Int. Cl.⁶ ................................................ G11B 05/66
[52] U.S. Cl. .................... 428/323; 428/694 B; 428/900; 427/128; 252/62.54
[58] Field of Search .............................. 428/323, 694 B, 428/900; 427/128; 252/62.54

[56] References Cited

U.S. PATENT DOCUMENTS 4,724,162  2/1988  Saito et al. ............................ 427/128

FOREIGN PATENT DOCUMENTS 54-28603   3/1979  Japan.
54-157603  12/1979  Japan.

OTHER PUBLICATIONS

R. F. Fedors, A Method For Estimating Both The Solubility Parameters and Molar Volumes of Liquids, *Polymer Engineering and Science*, vol. 14, No. 2 (1974).

*Primary Examiner*—Stevan A. Resan
*Attorney, Agent, or Firm*—Leydig, Voit & Mayer, Ltd.

[57] ABSTRACT

A magnetic paint including magnetic powder, a binder and organic solvents is provided. The magnetic paint is prepared by first dispersing the magnetic powder and an amount of the binder in the range from about 20% to about 80% by weight based on the weight of the total binder in a poor solvent of the binder so as to obtain a first dispersion, dispersing after adding a good solvent of the binder and the rest of the binder into the first dispersion, and then dispersing the mixture so as to a second dispersion. About 25% by weight or more of the binder based on the weight of the total binder is adsorbed to the magnetic powder.

4 Claims, No Drawings

MAGNETIC RECORDING MEDIUM PREPARED FROM A SPECIFIED MAGNETIC PAINT

BACKGROUND OF THE INVENTION

1. Field of the Invention

The present invention relates to a magnetic paint usable in forming a magnetic layer of a magnetic recording medium. More specifically, the present invention relates to a magnetic paint excellent in dispersibility of magnetic particles and application property to a substrate which is capable of producing a magnetic recording medium excellent in running stability, durability, electromagnetic conversion property, and the like.

2. Description of the Related Art

A magnetic tape and a floppy disk, which are magnetic recording mediums for general-purpose use, include a magnetic layer containing magnetic particles and a substrate. The magnetic tape and the floppy disk are produced by applying a magnetic paint obtained by dispersing needle-shaped magnetic particles having major axes of 1 μm or less in a binder solution together with additives such as a dispersing agent, a lubricant, an antistatic agent to a substrate such as a polyethyleneterephthalate film. The binder is required to be excellent in dispersibility, packing density, an orientating property of the magnetic particles, an adhesive property with the substrate, and provide high durability, wear resistance, heat resistance and the like to the magnetic layer.

As the binder, conventionally, a mixture of an adipate type or polycaprolactone type polyurethane and nitrocellulose or vinyl chloride copolymer is mainly used. Other examples of the binder include polyester.

In order to improve a S/N ratio (Signal/Noise ratio) of the magnetic recording medium, and enhance a recording density, it is necessary to fill and orientated magnetic particles having a high coercive force (Hc) such as magnetic particles finer than conventional ones and magnetic metal particles in the magnetic Layer to a high degree. However, these magnetic particles are insufficiently dispersed by conventional binders. The insufficient dispersion of the magnetic particles in the magnetic layer results in not only the deterioration in the electromagnetic conversion property of the magnetic recording medium, but also in an increase in the ratio of vacant space in the magnetic layer. The increase in the ratio of the vacant space leads to deterioration in the durability of the magnetic layer.

As a method for improving the dispersibility of the magnetic particles of the binder, the following method is known as effective. A polar group is introduced in the binder so as to enhance interaction between the magnetic particles and the binder, for the purpose of enhancing adsorption of the binder to the magnetic particles. For example, Japanese Laid-Open Patent Publication Nos. 54-28603 and 54-157603 disclose that the dispersibility of the magnetic particles is improved by introducing metal sulfonate groups to polyester or polyurethane molecules. Although the introduction of the metal sulfonate groups to the polyester or polyurethane molecules is significantly effective for improving the dispersibility of the conventional magnetic particles, it is insufficient For improving the dispersibility of finer magnetic particles than the conventional ones and magnetic particles having a higher coercive force.

Another known method for enhancing the adsorption of the binder to the magnetic particles is that a poor solvent of the binder is added to the magnetic paint so as to enhance an adsorption amount of the binder to the magnetic particles. However, according to this method, although the adsorption amount is increased, the magnetic particles to which the binder is adsorbed are easily aggregated to each other. As a result, the dispersibility of the magnetic particles and the flowability of the magnetic paint deteriorates, resulting in deterioration in characteristics such as in the surface smoothness property of the magnetic layer of the magnetic recording medium.

SUMMARY OF THE INVENTION

A magnetic paint according to the present invention includes magnetic powder, a binder and organic solvents. The magnetic paint is prepared by first dispersing the magnetic powder and an amount of the binder in a range from about 20% to about 80% by weight based on the weight of the total binder in a poor solvent of the binder so as to obtain a first dispersion, adding a good solvent of the binder and the rest of the binder into the first dispersion, and then dispersing the mixture so as to obtain a second dispersion. About 25% by weight or more of the binder based on the weight of the total binder is adsorbed to the magnetic powder.

In one embodiment of the invention, the binder and the solvent of the binder for the first dispersion and the second dispersion are selected so as to satisfy the following Equation (1):

$$R_1/R_2 > 1.2 \tag{1}$$

where $R_1$ represents a weight of the binder adsorbed to 1 g of the magnetic powder, when the magnetic powder in an amount four times the solid weight of the binder is dispersed in a solution in which the binder for the first dispersion is dissolved in a solvent for the first dispersion at 7.5% by weight concentration; and $R_2$ represents a weight of the binder adsorbed to 1 g of the magnetic powder, when the magnetic powder, in an amount four times the solid weight of the binder, is dispersed in a solution in which the binder for the second dispersion is dissolved in a solvent for the second dispersion at 7.5% by weight concentration.

According to another aspect of the invention, a magnetic recording medium includes a substrate and a magnetic layer. The magnetic layer is prepared from a magnetic paint containing magnetic powder, a binder and organic solvents. The magnetic paint is prepared by first dispersing the magnetic powder and an amount of the binder in the range from about 20% to about 80% by weight based on the weight of the total binder in a poor solvent of the binder so as to obtain a first dispersion, adding a good solvent of the binder and the rest of the binder into the first dispersion, and then dispersing the mixture so as to obtain a second dispersion. About 25% by weight or more of the binder based on the weight of the total binder being adsorbed to the magnetic powder.

In one embodiment of the invention, the binder and the solvent of the binder for the first dispersion and the second dispersion are selected so as to satisfy the following Equation (1):

$$R_1/R_2 > 1.2 \tag{1}$$

where $R_1$ represents a weight of the binder adsorbed to 1 g of the magnetic powder, when the magnetic powder, in an amount four times the solid weight of the binder, is dispersed in a solution in which the binder for the first dispersion is dissolved in a solvent for the first dispersion at 7.5% by weight concentration; and $R_2$ represents a weight of the binder adsorbed to 1 g of the magnetic powder, when the magnetic powder in an amount four times the solid weight of the binder is dispersed in a solution in which the binder for the second dispersion is dissolved in a solvent for the second dispersion at 7.5% by weight concentration.

Thus, the invention described herein makes possible the advantages of (1) providing a magnetic paint having good dispersibility of magnetic particles and a good application property; (2) providing a magnetic recording medium excellent in running stability, durability, an electromagnetic conversion property and the like, and having a good processability.

These and other advantages of the present invention will become apparent to those skilled in the art upon reading and understanding the following detailed description with reference to the accompanying figures.

DESCRIPTION OF THE PREFERRED EMBODIMENTS

A magnetic paint of the present invention is prepared in the following manner. First, magnetic particles and an amount of the binder in a range from about 20% to 80% by weight, and preferably about 30% to about 70% by weight based on the weight of the total binder, are dispersed in a poor solvent of the binder so as to obtain a first dispersion. Next, a good solvent of the binder and the rest of the binder are added to the first dispersion, and then the mixture is dispersed to obtain a second dispersion. The first dispersing treatment and the second dispersing treatment can be successively performed.

Examples of the magnetic powder which may be used in the magnetic paint of the present invention include $\gamma\text{-Fe}_2O_3$, a mixed crystal of $\gamma\text{-Fe}_2O_3$ and $Fe_3O_4$, $\gamma\text{-Fe}_2O_3$ or $Fe_3O_4$ with cobalt, and a ferromagnetic oxide such as barium ferrite, and a ferromagnetic alloy powder such as Fe—Co, Fe—Co—Ni.

Examples of the binder which may be used in the present invention includes a polyurethane resin, a polyester resin, a vinyl chloride copolymer, an epoxy resin, phenoxy resin, polyvinylbutyral, nitrocellulose; resins having metal salts of organic or inorganic acid groups such as a sulfonic acid group, carboxylic acid group, phosphoric acid group, and phosphonic acid group, or a polar group such as a sulfobetaine group in the molecular chain. Preferably, the binder is a polyurethane resin, a polyester resin, a, vinyl chloride copolymer and a resin having a polar groups more preferably, the binder is a resin having an alkali metal sulfonate, which strongly adsorbs to the magnetic particles, so that the dispersibility of the magnetic particles can be improved.

The binder may be used in a range from about 10 parts by weight to about 50 parts by weight, and preferably from about 15 parts by weight to about 30 parts by weight, based on 100 parts by weight of the magnetic powder.

The poor solvent and the good solvent of the binder may be selected based on solubility parameters (SP values). The poor solvent for the first dispersion can be selected in such a manner that the SP value Of the binder obtained by calculating based on the method of Fedors (Polymer Engineering and Science, Vol.14, 147 (1974)) is larger than the SP value of the solvent by 0.7 or more, and preferably 1.0 or more. The good solvent for the second dispersion may be selected in such a manner that the difference of the SP value between the bender and the good solvent is 1.0 or less, and preferably 0.7 or less. Two or more different binders may be used in each dispersion. In this case, an average of SP values of the binders may be used. In the case where the binder has functional groups such as urethane bonds and hydroxyl groups which can form hydrogen bonds, and polar groups having a strong ionic bonding property such as metal sulfonate, metal carboxylate, metal phosphate, sulfonic acid groups, carboxylic acid groups, and phosphoric acid groups, which can form strong ionic bonds, an Sp value obtained by calculating except for these Functional groups and polar groups can be used as the SP value of the binder.

The binder and the solvents of the binder for the first and second dispersions preferably satisfy the following inequality (1):

$$R_1/R_2 > 1.2 \tag{1}$$

where $R_1$ represents a weight of a binder which is adsorbed to 1 g of a magnetic powder when the magnetic powder, in an amount a weight four times the solid weight of the binder, is dispersed into a solution in which the binder for the first dispersion is dissolved in a solvent for the first dispersion at a concentration of 7.5% by weight; and $R_2$ represents a weight of a binder which is adsorbed to 1 g of a magnetic powder when the magnetic powder, in an amount four times the solid weight of the binder, is dispersed in a solution in which the binder used for the second dispersion is dissolved in a solvent used for the second dispersion at a concentration of 7.5% by weight. $R_1/R_2$ is preferably 1.3 or more. When $R_1/R_2$ is less than 1.2, the effects of the present invention cannot be sufficiently attained. The adsorption amount is affected by the type of the magnetic powder, method of dispersion, dispersing conditions or the like, in addition to the type of the binder. On the other hand, the value of $R_1/R_2$ is scarcely affected by the methods of dispersion, the dispersing conditions or the like.

The solvent for the second dispersion and the solvent for the first dispersion may be identical to or different from each other, provided that the relationship of the SP values between the birder and the solvent is satisfied. The binder for the second dispersion and the binder for the first dispersion may be identical to or different from each other. In the case where the binder for the second dispersion is different from that for the first dispersion, the binder for the second dispersion is preferably comparable to or more excellent than the binder for the first dispersion in terns of its dispersing ability of the magnetic particles. The dispersing ability of the binder may be evaluated based on the gloss of a magnetic layer formed of a composition containing the binder and a magnetic powder (The evaluation of the gloss will be described later).

For the purpose of improving the durability, heat resistance and the like of the magnetic layer formed of the magnetic paint of the present invention, a cross-linking agent may be added to the magnetic paint. As the cross-linking agent, polyisocyanate compounds, epoxy resin, melamine resin, urea resin, acid anhydrides and the like may be used. The preferable cross-linking agent is polyisocyanate compounds. The cross-linking agent may be used in a range from about 5 parts by weight to about 60 parts by weight, and preferably about 20 parts by weight to about 40 parts by weight based on 100 parts by weight of the binder.

Additives may be included in the magnetic paint of the present invention, if desired. Examples of such additives include a plasticizer such as dibutyl phthalate and triphenyl phosphate, a lubricant such as palmitic acid, stearic acid, oleic aced, zinc stearate, dioctyl sodium sulfosuccinate, t-butylphenol polyethylene ether, sodium ethylnaphthalensulfonate, dilauryl succinate, soybean oil lecithin, silicone oil, and various antistatic agents. The above-mentioned cross-linking agents and additives may be added at the second dispersing step or after the second dispersing step.

As described above, the magnetic paint of the present invention contains a magnetic powder, a binder and organic solvents including a poor solvent and a good solvent. The binder is adsorbed to the magnetic powder in an amount of about 25% by weight or more, preferably about 30% by weight or more, and more preferably about 45% by weight or more of the weight of the total binder When the adsorbed amount of the binder is less than 25% by weight, dispersion stability of the magnetic particles is lowered. An adsorption amount of the binder to the magnetic powder can be obtained by measuring an amount of the binder which is present in the liquid ingredient of the magnetic paint, and subtracting the result from the total amount of the binder. For example, the magnetic paint is centrifuged between 20° C. and 30° C. at 20,000 rpm for one hour, and the supernatant is skimmed out to be dried. Then, a solid weight contained therein is measured so as to obtain the adsorption amount of the binder to the magnetic powder.

As described above, when the binder and the magnetic powder are dispersed together in the poor solvent of the binder, binder molecules are strongly adsorbed to the magnetic particles. The binder molecules adsorbed in the poor solvent are not easily desorbed from the magnetic particles by diluting the dispersion or changing the solvent. Thus, the dispersion is dispersed again together with the binder in the good solvent of the binder. By such an operation, binder molecules dissolved in the good solvent at a high concentration advantageously prevent the dispersed particles from aggregating to each other, thus obtaining a stable dispersion of magnetic powder, i.e., a magnetic pain. Furthermore, the improvement of the dispersibility of the magnetic paint leads to improvement of the flowability of the magnetic paint. In addition, the improvement of the flowability of the magnetic paint accelerates the speed of application of the magnetic paint, resulting in an improvement in proccessability.

EXAMPLES

Hereinafter, the present invention will be described in detail by way of examples. However, the present invention is not limited to the following examples.

Table 1 shows compositions, properties and adsorption amounts of resins used as a binder of magnetic particles. Measurement results of 60 degree gloss of a magnetic layer obtained from a prepared dispersion is shown in square brackets in Table 1. Binder resins 1 to 6 are polyester-urethane. Resin 7 is a vinyl chloride copolymer. Resin 8 is the same as the resin 1 except for being obtained by using a high molecular weight type PES-1 instead of the PES-1 of resin 1. Resin 9 is a block polyester obtained by additional polymerization of ε-caprolactone with resin 8 in a melt stats.

An adsorption amount of each resin to the magnetic particles was obtained in the following manner:

Solutions (7.5% by weight) in which 3 g of respective binders were dissolved in 37 g of various solvents were prepared. To these solutions, 12 g, i.e., a weight four times th solid weight of the binder, of magnetic powder (metal magnetic particles manufactured by Kanto Denka Kogyo Co., Ltd.; BET specific surface area, 58 m$^2$/g; Hc, 1610 Oe) and 50 g of glass beads were added. These mixtures were dispersed by a "Paint Shaker" manufactured by Toyo Seiki Co., Ltd. for five hours to obtain dispersions. The obtained dispersions were centrifuged 20,000 rpm for one hour, so as to skim out the supernatant. Then, a solid weight contained therein was measured, and an adsorption amount per 1 g of the magnetic powder was calculated by the following equation:

An adsorption amount per 1g of the magnetic powder (mg/g)=(0.075−C)×40×10$^3$/12

(where C is a resin concentration (%) in the supernatant/100.)

TABLE 1

| Binder | Composition or Brand name (weight ratio) | number average molecular weight | Tg (°C.) | Adsorption amount (mg/g) [60 degree gloss] Solvent composition | | | | |
|---|---|---|---|---|---|---|---|---|
| | | | | S-1 | S-2 | S-3 | S-4 | S-4 |
| resin 1 | PES-1/NPG/MDI (100/7/24) | 25000 | 81 | — | 180 [3] | 170 [60] | 130 [130] | 68 [130] |
| resin 2 | PES-2/NPG/MDI (100/7/28) | 38000 | −27 | 175 [95] | 135 [130] | 120 [125] | 90 [120] | 75 [120] |
| resin 3 | PES-3/NPG/MDI (100/7/28) | 23000 | 72 | 185 [40] | 155 [125] | 120 [130] | 100 [130] | — |
| resin 4 | PEG-1/PEG-4/ NPG/MDI (60/40/7/31) | 33000 | 28 | — | — | 100 [115] | 80 [115] | — |
| resin 5 | PES-5/NPG/MDI (100/7/27) | 25000 | 80 | 150 [1] | 75 ∂1] | 60 [2] | 30 [11] | — |
| resin 6 | PES-4/NPG/DMBA/ MDI (100/4/4/41) | 43000 | −18 | 160 [40] | 115 [105] | 90 |100] | 75 [100] | 60 [95] |
| resin 7 | VAGH (Union Carbide) | 27000 | 77 | 120 [60] | — | 80 [95] | 55 [90] | — |
| resin 8 | the same composition as resin 1 except for using a high molecular weight type of PES-1 instead of PES-1 | 21000 | 65 | — | 190 [5] | 180 [40] | 135 [130] | — |
| resin 9 | PES-6 | 30000 | 5 | 170 [20] | 140 [80] | 110 [125] | 85 [125] | — |

—: no data.

The abbreviations in Table 1 represent the following substances.

PES-1: T/I/DSN//EG/NPG (a mole ratio of 50/47.5/2.5//50/50) number-average molecule weight $(M_N)$=2800

PES-2: AA/DSN//HD/NPG (a mole ratio of 97/3//70/30) $M_N$=2000

PES-3: I/O/DSN//EG/NPG/CHDM (a mole ratio of 70/27.5/2.5//20/ 60/20)$M_N$=2000

PES-4: polycaprolactone $M_N$=1000

PES-5: T/I//EG/NPG (a mole ratio of 50/50//50/50) $M_N$=2000

PES-6: T/I/DSN//EG/NPG//ε-caprolactone (a mole ratio of 50/47.5/2.5//50/50//100)

NPG: neopentylglycol

MDI: 4,4'-diphenylmethanediisocyanate

DMBA: 2,2-dimethylolbutanoic acid, where T: terephthalic acid,

I: isophthalic acid,

DSN: sodium 5-sulfoisophthalate,

EG: ethyleneglycol,

AA: adipic acid,

HD: 1,6-hexanediol

O: orthophthalic acid, and CHDM: cyclohexanedimethanol.

Solvent Composition: solvent copositions at the time of measuring the adsorption amount (weight ratio).

S-1: toluene/ 2-butanone (herein after referred to HEX)= 80/20

S-2: toluene/ MEK=63.5/36.5

S-3: toluene/ MEK=50/50

S-4: toluene/ MEK/cyclohexanone=36.5/36.5/27

S-5: toluene/ MEK/cyclohexanone=9.5/36.5/54

(Evaluation Method)

A. Adsorption Rate of Binder of Magnetic Paint

A magnetic paint was centrifuged 20,000 rpm for one hour, so as to skim out the supernatant. Then, an adsorption amount thereof was measured as described above, and an adsorption rate was calculated by the following equation:

An adsorption rate (%)=an adsorption amount×100 /(total weight of the binder)

B. Calculation Method of $R_1$ and $R_2$

In a solution (7.5% by weight concentration) in which 3 g of a binder for the first dispersion was dissolved in 37 g of a solvent for the first dispersion, 12 g, i.e., a weight four times the solid weight of the binder, of magnetic powder (metal magnetic particles manufactured by Kanto Denka Kogyo Co., Ltd.; BET specific surface area, 58 m²/g; Hc, 1610 Oe) was dispersed by a Paint shaker with glass beads medium. Then, a weight (adsorption amount $R_1$) of the binder adsorbed to 1 g of the magnetic powder of the obtained dispersion was calculated by above-mentioned equation. Similarly, in a solution (7.5% by weight concentration) in which 3 g of a binder for the second dispersion was dissolved in 37 g of a solvent for the second dispersion, 12 g, i.e. a weight four times the solid weight of the binder, of magnetic powder (metal magnetic particles manufactured by Kanto Denka Kogyo Co., Ltd.; BET specific surface area, 58 m²/g; Ha, 1610 Oe) was dispersed. Then, a weight (adsorption amount $R_2$) of the binder adsorbed to 1 g of the magnetic powder of the obtained dispersion was calculated.

C. Evaluation Method of Magnetic Recording Medium i) Preparation of Magnetic Tape A magnetic paint was applied onto a polyethyleneterephthalate (PET) film having a Thickness of 15 μm so as to have a thickness of 4 am after being dried to form a magnetic layer. The magnetic layer was then dried under a magnetic field of 2000 gauss, and the surface of the magnetic layer was subjected to a smoothing treatment by passing through a calender roll at 80° C. and at a line pressure of 200 Kg/cm, so as to produce a magnetic tape.

ii) Dispersibility of Magnetic Powder

A 60 degree-gloss and a square ratio of the magnetic tape before being subjected to the calendering process were measured, in order to evaluate the dispersibility. The dispersibility is more satisfactory as each value is greater.

The measurement of the 60 degree-gloss was conducted using a Gloss Checker LG-320 (manufactured by Horiba manufacturing Co., Ltd.). The measurement of the square ratio was conducted using a vibration sample type magnetometer BHV-50 (manufactured by Riken Electronic Co., Ltd.).

iii) Packing density of Magnetic Layer

The magnetic tape was cut out in a predetermined area, and the cut sample was weighed (W1). Then, the cut sample was immersed in a silicone oil and subjected to an ultrasonic treatment for 10 minutes. Thereafter, the silicone oil on the sample was wiped off, and then the sample was weighed (W2), so as to obtain an increase in the weight of the sample by the immersion in the silicone oil. The magnetic layer was scrubbed from the PET film by using a paper dampened with MEK, and then the PET film weighed (W3). Based on the increased weight, the packing density of the magnetic layer was calculated by the following equation:

$$\text{packing density (\%)} = \frac{W2 - W1}{W1 - W3} \times 100$$

Since the silicone oil enters into vacant spaces of the magnetic layer, a greater increase in the ratio in weight means that the packing density of the magnetic layer is lower.

iv) Durability of Magnetic Layer

The magnetic tape was allowed to run at atmospheric temperatures of 10° C. and 40° C., with a commercially available VTR deck, 100 times. Then, flaws on the magnetic layer were observed, and the durability w as evaluated using the following criteria:

Wear States of Magnetic Layer

○: No flaw on Magnetic Layer.

Δ: Few flaws on Magnetic Layer

X: Many flaws on Magnetic Layer v) Elastic Modulus of Magnetic Layer

The magnetic paint was applied onto a polypropylene film so as to have a thickness of 25 μm after being dried, and the magnetic paint was dried. Then, the dried magnetic layer was peeled off from the polypropylene film, and the temperature dependence of the storage modulus (E') was measured by FT leospectolar manufactured by Leology Co., Ltd. As the packing density of the magnetic layer is higher, the elastic modulus is higher.

EXAMPLE 1

A composition (a) having the proportions recited below was dispersed for two hours with a "Paint Shaker" manufactured by Toyo Seiki Co., Ltd. Then, after adding a compositions (b), also having the proportions recited below, the resultant mixture was dispersed for three hours. To an obtained dispersion, 1 part by weight of a polyisocyanate compound (Milionate MR manufactured by Nippon Polyurethane Industries Co., Ltd.) as a curing agent, and 0.05 parts by weight of stearic acid and 0.05 parts by weight of butyl stearate as lubricants were added, and further mixed for 30 minutes to obtain a magnetic paint. The magnetic paint was applied onto a polyethyleneterephthalate film having a thickness of 15 μm so as to have a thickness of 4 μm after being dried to form a magnetic layer. The magnetic layer was then dried under a magnetic field of 2000 gauss, and the surface of the magnetic layer was subjected to a smoothing treatment by passing through a calender roll at 80° C. and at a line pressure of 200 Kg/cm, so as to produce a magnetic tape. The obtained magnetic tape was allowed to stand at 60° C. for 24 hours, and then slit into a width of ½ inches. The obtained magnetic paint and magnetic tape were evaluated by the above-mentioned evaluation methods. The results are shown in Table 2. The adsorption amount of the binder at the end of the second dispersing treatment was 120 mg per 1 g of the magnetic powder (48% by weight of the total binder was adsorbed), and a value of $R_1/R_2$ in Equation (1) was 1.5.

|  | (pats by weight) |
|---|---|
| Composition (a) of Example 1 | |
| Solution of Binder Resin 1 | 5 |
| (30% solution of MEK / toluene = 1 / 1) | |
| Magnetic Powder | 12 |
| Toluene | 10 |
| MEK | 5 |
| Glass Beads (having a diameter of 2 mm) | 50 |
| Composition (b) of Example 1 | |
| Solution of Binder Resin 2 | 5 |
| (30% solution of MEK / toluene = 1 / 1) | |
| Cyclohexanone | 10 |
| MEK | 5 |

Comparative Examples 1 to 3

In Comparative Example 1, a magnetic paint and a magnetic tape were obtained in the same manner as in Example 1, except that the dispersing treatment was conducted once using the following composition (a mixture of the compositions (a) and (b) of Example 1) instead of the compositions (a) and (b) of Example 1. The obtained Magnetic paint and the magnetic tape were evaluated by the above-mentioned methods. The results are shown in Table 2.

| Composition of Comparative Example 1 | (pats by weight) |
|---|---|
| Solution of Binder Resin 1 | 5 |
| (30% solution of MEK / toluene = 1 / 1) | |
| Solution of Binder Resin 2 | 5 |
| (30% solution of MEK / toluene = 1 / 1) | |
| Magnetic Powder | 12 |
| Toluene | 10 |
| MEK | 10 |
| Cyclohexanone | 10 |
| Glass Beads (having a diameter of 2 mm) | 50 |

In Comparative Example 2, a magnetic paint and a magnetic tape were obtained in the same manner as in Example 1, except that the following compositions (a') and (b') (having different solvent compositions from the compositions (a) and (b) of Example 1) were used instead of the compositions (a) and (b) of Example 1. The obtained magnetic paint and the magnetic tape were evaluated by the above-mentioned methods. The results are shown in Table 2.

|  | (pats by weight) |
|---|---|
| Composition (a') of Comparative Example 2 | |
| Solution of Binder Resin 1 | 5 |
| (30% solution of MEK / toluene = 1 / 1) | |
| Magnetic Powder | 12 |
| Toluene | 5 |
| MEK | 5 |
| Cyclohexanone | 5 |
| Glass Beads (having a diameter of 2 mm) | 50 |
| Composition (b') of Comparative Example 2 | |
| Solution of Binder Resin 2 | 5 |
| (30% solution of MEK / toluene = 1 / 1) | |
| Toluene | 5 |
| MEK | 5 |
| Cyclohexanone | 5 |

In Comparative Example 3, a magnetic paint and a magnetic tape were obtained in the same manner as in Example 1, except that the following compositions (a") and (b") (having different solvent compositions from the compositions (a) and (b) of Example 1) were used instead of the compositions (a) and (b) of Example 1. The obtained magnetic paint and the magnetic tape were evaluated by the above-mentioned methods. The results are shown in Table 2.

|  | (pats by weight) |
|---|---|
| Composition (a") of Comparative Example 3 | |
| Solution of Binder Resin 1 | 5 |
| (30% solution of MEK / toluene = 1 / 1) | |
| Magnetic Powder | 12 |
| Cyclohexanone | 10 |
| MEK | 5 |
| Glass Beads (having a diameter of 2 mm) | 50 |
| Composition (b") of Comparative Example 3 | |
| Solution of Binder Resin 2 | 5 |
| (30% solution of MEK / toluene = 1 / 1) | |
| Toluene | 10 |
| MEK | 5 |

TABLE 2

|  | Example 1 | Comparative Example 1 | Comparative Example 2 | Comparative Example 3 |
|---|---|---|---|---|
| properties of the magnetic paint | | | | |
| $R_1/R_2$ value | 1.5 | | 1.1 | 0.6 |
| Adsorption ratio of the binder % | 48 | 46 | 46 | 47 |
| properties of the magnetic layer | | | | |
| Gloss | 160 | 125 | 125 | 127 |
| Square ratio | 0.88 | 0.82 | 0.82 | 0.83 |
| Packing density % | 6 | 19 | 20 | 18 |
| Durability | | | | |
| running at 10° C. | ○ | ○ ~ Δ | ○ ~ Δ | ○ ~ Δ |
| running at 40° C. | ○ | ○ ~ Δ | ○ ~ Δ | ○ ~ Δ |

EXAMPLE 2

A magnetic paint was obtained in the same manner as in Example 1, except that compositions (c) and (d) in the below recited proportions were used for a first dispersion and a second dispersion, respectively, and a magnetic tape was produced. The obtained magnetic paint and the magnetic tape were evaluated by the above-mentioned methods. The results are in Table 3.

The adsorption amount, of the binder at the end of the second dispersion was 125 mg per 1 g of the magnetic powder (50% by weight of the total binder was adsorbed), and a value of $R_1/R_2$ shown in Equation (1) was 1.5.

|  | (pats by weight) |
|---|---|
| Composition (c) of Example 2 | |
| Solution of Binder Resin 3 | 5 |
| (30% solution of MEK / toluene = 1 / 1) | |
| Magnetic Powder | 12 |
| Toluene | 14 |
| MEK | 1 |
| Glass Beads (having a diameter of 2 mm) | 50 |
| Composition (d) of Example 2 | |
| Solution of Binder Resin 3 | 5 |
| (30% solution of MEK / toluene = 1 / 1) | |
| Toluene | 1 |
| MEK | 14 |

Examples 3 to 6 and Comparative Examples 4 to 7

Examples 3 to 6 and Comparative Examples 4 to 7 were conducted in the same manner as Example 2, except that proportions of the binder for the first dispersion and the second dispersion, and a ratio of toluene to MEK in the first dispersing treatment were changed. The obtained magnetic paint and magnetic tape were evaluated by the above-mentioned methods. The results are shown in Tables 3 to 5.

TABLE 3

|  | Example 2 | Example 3 | Example 4 | Example 5 |
|---|---|---|---|---|
| properties of the magnetic paint | | | | |
| Resin weight ratio of the first to the second dispersion | 50:50 | 50:50 | 50:50 | 30:70 |
| Weight ratio of Toluene to MEK in the first dispersion | 85:15 | 80:20 | 64:36 | 80:20 |
| $R_1/R_2$ value | 1.5 | 1.5 | 1.24 | 1.5 |
| Adsorption ratio of the binder % | 50 | 52 | 49 | 50 |
| properties of the magnetic layer | | | | |
| Gloss | 170 | 180 | 155 | 170 |
| Square ratio | 0.88 | 0.90 | 0.85 | 0.88 |
| Packing density % | 4 | 3 | 13 | 5 |
| Durability | | | | |
| running at 10° C. | ○ | ○ | ○ | ○ |
| running at 40° C. | ○ | ○ | ○ ~ Δ | ○ |

TABLE 4

|  | Example 6 | Comparative Example 4 | Comparative Example 5 | Comparative Example 6 |
|---|---|---|---|---|
| properties of the magnetic paint | | | | |
| Resin weight ratio of the first to the second dispersion | 70:30 | 50:50 | 50:50 | 15:85 |
| Weight ratio of Toluene to MEK | 80:20 | 60:40 | 20:80 | 80:20 |

TABLE 4-continued

|  | Example 6 | Comparative Example 4 | Comparative Example 5 | Comparative Example 6 |
|---|---|---|---|---|
| in the first dispersion | | | | |
| $R_1/R_2$ value | 1.5 | 1.16 | 0.9 | 1.5 |
| Adsorption ratio of the binder % | 50 | 48 | 48 | 48 |
| properties of the magnetic layer | | | | |
| Gloss | 175 | 138 | 139 | 135 |
| Square ratio | 0.88 | 0.82 | 0.82 | 0.82 |
| Packing density % | 5 | 20 | 20 | 22 |
| Durability | | | | |
| running at 10° C. | ○ | ○ ~ Δ | ○ ~ Δ | ○ ~ Δ |
| running at 40° C. | ○ | ○ ~ Δ | ○ ~ Δ | ○ ~ Δ |

Comparative Example 8

In Comparative Example 8, a magnetic paint and a magnetic tape were obtained in the same manner as in Example 2, except that the dispersing treatment was conducted once using the following composition (a mixture of the compositions (c) and (d) of Example 2) instead of the compositions (c) and (d) of Example 2. The obtained magnetic paint and the magnetic tape were evaluated by the above-mentioned methods. The results are shown in Table 5.

| Composition of Comparative Example 8 | (pats by weight) |
|---|---|
| Solution of Binder Resin 3 | 10 |
| (30% solution of MEK / toluene = 1 / 1) | |
| Magnetic Powder | 12 |
| Toluene | 15 |
| MEK | 15 |
| Glass Beads (having a diameter of 2 mm) | 50 |

TABLE 5

|  | Comparative Example 7 | Comparative Example 8 |
|---|---|---|
| properties of the magnetic paint | | |
| Resin weight ratio of the first to the second dispersion | 85:15 | |
| Weight ratio of Toluene to MEK in the first dispersion | 80:20 | |
| $R_1/R_2$ value | 1.5 | |
| Adsorption ratio of total binder % | 48 | 46 |
| properties of the magnetic layer | | |
| Gloss | 135 | 130 |
| Square ratio | 0.82 | 0.81 |
| Packing density % | 21 | 24 |
| Durability | | |
| running at 10° C. | ○ ~ Δ | ○ ~ Δ |
| running at 40° C. | ○ ~ Δ | Δ |

EXAMPLE 7

A magnetic paint was obtained in the same manner as in Example 1, except that compositions (e) and (f) in the proportions recited below were used for the first dispersion and the second dispersion, respectively, and a magnetic tape was further produced. The obtained magnetic paint was applied onto a polypropylene film so as to have a thickness of 25 μm after being dried to form a magnetic layer, then dried by hot air at 80° C. for 10 minutes. Next, the magnetic layer was aged at 60° C. for 24 hours. Thereafter, an elastic modulus of the magnetic layer was measured. The obtained magnetic paint and the magnetic tape were evaluated by the above-mentioned method. The results are shown in Table 6.

The adsorption amount of the binder at the end of the second dispersing treatment was 100 mg per 1 g of the magnetic powder (40% by weight of the total binder was adsorbed), and a value of $R_1/R_2$ in Equation (1) was 1.5.

|  | (pats by weight) |
|---|---|
| Composition (e) of Example 7 | |
| Solution of Binder Resin 4 | 5 |
| (30% solution of MEK / toluene = 1 / 1) | |
| Magnetic Powder | 12 |
| Isooctane (2,2,4-trimethylpentane) | 4 |
| Toluene | 6 |
| MEK | 5 |
| Glass Beads (having a diameter of 2 mm) | 50 |
| Composition (f) of Example 7 | |
| Solution of Binder Resin 4 | 5 |
| (30% solution of MEK / toluene = 1 / 1) | |
| Toluene | 5 |
| MEK | 10 |

Comparative Example 9

In Comparative Example 9, a magnetic paint and a magnetic tape were obtained in the same manner as in Example 7, except that dispersing treatment was conducted once using the following composition (a mixture of the compositions (e) and (f) of Example 7) instead of the compositions (e) and (f) of Example 7. The obtained magnetic paint and the magnetic tape were evaluated by the above-mentioned methods. The results are shown in Table 6.

| Composition of Comparative Example 9 | (pats by weight) |
|---|---|
| Solution of Binder Resin 4 | 10 |
| (30% solution of MEK / toluene = 1 / 1) | |
| Magnetic Powder | 12 |
| Isooctane | 4 |
| Toluene | 11 |
| MEK | 15 |
| Glass Beads (having a diameter of 2 mm) | 50 |

TABLE 6

|  | Example 7 | Comparative Example 9 |
|---|---|---|
| properties of the magnetic paint | | |
| $R_1/R_2$ value | 1.5 | |
| Adsorption ratio of the binder % | 40 | 36 |
| properties of the magnetic layer | | |
| Gloss | 153 | 115 |
| Square ratio | 0.86 | 0.80 |
| Packing density % | 11 | 21 |
| Durability | | |
| running at 10° C. | o | o |
| running at 40° C. | o | o ~ Δ |

TABLE 6-continued

|  | Example 7 | | | Comparative Example 9 | | |
|---|---|---|---|---|---|---|
| viscoelasticity of the magnetic layer | | | | | | |
| Temperature °C. | 0 | 30 | 60 | 0 | 30 | 60 |
| Storage modulus $10^{10}$ dyne/cm³ | 7.2 | 6.1 | 3.4 | 5.0 | 4.2 | 1.9 |

EXAMPLES 8 TO 18

A magnetic paint and a tape were obtained in the same manner as in Example 1, except that compositions I and II shown in Tables 7 to 9 (the resin numbers shown in Tables 7 to 9 correspond to the resin numbers shown in Table 1) were used in the first dispersion and the second dispersion, respectively. The obtained magnetic paint and the magnetic tape were evaluated by the above-mentioned methods. The results are shown in Tables 7 to 9.

TABLE 7

|  | Example 8 | Example 9 | Example 10 | Example 11 |
|---|---|---|---|---|
| Composition of the magnetic paint (parts by weight) | | | | |
| Composition I | | | | |
| Magnetic powder | 12 | 12 | 12 | 12 |
| Binder resin (solid) | resin 5 1.5 | resin 5 2 | resin 2 1.5 | resin 2 1.5 |
| Toluene | 14.65 | 14.65 | 16.75 | 16.75 |
| MEK | 3.85 | 3.85 | 1.75 | 1.75 |
| Cyclohexanone | 0 | 0 | 0 | 0 |
| Glass beads | 50 | 50 | 50 | 50 |
| Composition II | | | | |
| Binder resin (solid) | resin 1 1.5 | resin 1 1 | resin 2 1.5 | resin 1 1.5 |
| Toluene | 1.75 | 1.75 | 1.75 | 1.75 |
| MEK | 6.75 | 6.75 | 16.75 | 16.75 |
| Cyclohexanone | 10 | 10 | 0 | 0 |
| properties of the magnetic paint | | | | |
| $R_1/R_2$ value | 1.5 | 2.3 | 1.6 | 1.5 |
| Adsorption ratio of the binder % | 43 | 29 | 50 | 52 |
| properties of the magnetic layer | | | | |
| Gloss | 140 | 129 | 165 | 165 |
| Square ratio | 0.84 | 0.82 | 0.89 | 0.89 |
| Packing density % | 12 | 15 | 10 | 9 |
| Durability | | | | |
| running at 10° C. | o | o | o | o |
| running at 40° C. | o | o | o~Δ | o |

TABLE 8

|  | Example 12 | Example 13 | Example 14 | Example 15 |
|---|---|---|---|---|
| Composition of the magnetic paint (parts by weight) | | | | |
| Composition I | | | | |
| Magnetic powder | 12 | 12 | 12 | 12 |
| Binder resin (solid) | resin 5 1.5 | resin 7 1.5 | resin 7 1.5 | resin 2 and 3 0.75 each |
| Toluene | 14.65 | 20 | 16.75 | 13 |
| MEK | 3.85 | 3.5 | 1.75 | 5.5 |
| Cyclohexanone | 0 | 0 | 0 | 0 |
| Glass beads | 50 | 50 | 50 | 50 |

TABLE 8-continued

| | Example 12 | Example 13 | Example 14 | Example 15 |
|---|---|---|---|---|
| Composition II | | | | |
| Binder resin (solid) | resin 6 1.5 | resin 6 1.5 | resin 2 1.5 | resin 2 and 3 0.75 each |
| Toluene | 1.75 | 1.75 | 1.75 | 5.5 |
| MEK | 6.75 | 6.75 | 16.75 | 13 |
| Cyclohexanone | 10 | 5 | 0 | 0 |
| properties of the magnetic paint | | | | |
| $R_1/R_2$ value | 1.9 | 1.8 | 1.7 | 1.5 |
| Adsorption ratio of the binder % | 32 | 28 | 36 | 48 |
| properties of the magnetic layer | | | | |
| Gloss | 135 | 145 | 135 | 165 |
| Square ratio | 0.84 | 0.85 | 0.85 | 0.88 |
| Packing density % | 12 | 13 | 11 | 6 |
| Durability | | | | |
| running at 10° C. | ○ | ○ | ○ | ○ |
| running at 40° C. | ○ | ○ | ○ | ○ |

TABLE 9

| | Example 16 | Example 17 | Example 18 |
|---|---|---|---|
| Composition of the magnetic paint (parts by weight) | | | |
| Composition I | | | |
| Magnetic powder | 12 | 12 | 12 |
| Binder resin (solid) | resin 8 1.5 | resin 8 1.5 | resin 8 1.5 |
| Toluene | 13 | 13 | 13 |
| MEK | 5.25 | 5.25 | 5.25 |
| Cyclohexanone | 0 | 0 | 0 |
| Glass beads | 50 | 50 | 50 |
| Composition II | | | |
| Binder resin (solid) | resin 2 1.5 | resin 4 1.5 | resin 9 1.5 |
| Toluene | 1.75 | 1.75 | 1.75 |
| MEK | 5.25 | 5.25 | 5.25 |
| Cyclohexanone | 10 | 10 | 10 |
| properties of the magnetic paint | | | |
| $R_1/R_2$ value | 1.4 | 1.7 | 1.5 |
| Adsorption ratio of the binder % | 55 | 41 | 48 |
| properties of the magnetic layer | | | |
| Gloss | 165 | 160 | 160 |
| Square ratio | 0.88 | 0.88 | 0.87 |
| Packing density % | 8 | 8 | 10 |
| Durability | | | |
| running at 10° C. | ○ | ○ | ○ |
| running at 40° C. | ○ | ○ | ○ |

Comparative Examples 10 to 13

A magnetic paint and a magnetic tape were obtained in the same manner as in Example 1, except that compositions I and II shown in Table 10 (the resin numbers shown in Table 10 correspond to the resin numbers shown in Table 1) were used in the first dispersion and the second dispersion, respectively. The obtained magnetic paint and the magnetic tape were evaluated by the above-mentioned methods. The results are shown in Table 10. In comparative Examples 10 to 13, the $R_1/R_2$ value and the adsorption ratios of the total binder do not fall within the range of the present invention.

TABLE 10

| | Comparative Example 10 | Comparative Example 11 | Comparative Example 12 | Comparative Example 13 |
|---|---|---|---|---|
| Composition of the magnetic paint (parts by weight) | | | | |
| Composition I | | | | |
| Magnetic powder | 12 | 12 | 12 | 12 |
| Binder resin (solid) | resin 1 1.5 | resin 5 1.5 | resin 1 1.5 | resin 5 1.5 |
| Toluene | 11.75 | 1.75 | 6.75 | 14.65 |
| MEK | 6.75 | 6.75 | 6.75 | 3.86 |
| Cyclohexanone | 0 | 10 | 5 | 0 |
| Glass beads | 50 | 50 | 50 | 50 |
| Composition II | | | | |
| Binder resin (solid) | resin 5 1.5 | resin 1 1.5 | resin 5 1.5 | resin 5 1.5 |
| Toluene | 1.75 | 11.75 | 6.75 | 1.75 |
| MEK | 6.75 | 6.75 | 6.75 | 6.75 |
| Cyclohexanone | 10 | 0 | 5 | 10 |
| properties of the magnetic paint | | | | |
| $R_1/R_2$ value | 3.3 | 0.4 | 2.9 | 7.5 |
| Adsorption ratio of the binder % | 22 | 32 | 18 | 8 |
| properties of the magnetic layer | | | | |
| Gloss | 95 | 105 | 50 | 30 |
| Square ratio | 0.75 | 0.78 | 0.67 | 0.67 |
| Packing density % | 28 | 26 | 35 | 25 |
| Durability | | | | |
| running at 10° C. | Δ | ○~Δ | x | Δ |
| running at 40° C. | x | Δ | x | x |

Comparative Examples 14 to 21

A magnetic paint and a magnetic tape were obtained in the same manner as in Comparative Example 1, except that mixtures of the compositions used in the first dispersion and the second dispersion in Examples 8, 12 to 18 were used, respectively. The obtained magnetic paint and the magnetic tape were evaluated by the above-mentioned methods. The results are shown in Tables 11 and 12.

TABLE 11

| | Comparative Example 14 | Comparative Example 15 | Comparative Example 16 | Comparative Example 17 |
|---|---|---|---|---|
| Composition of the magnetic paint (parts by weight) | | | | |
| Magnetic powder | 12 | 12 | 12 | 12 |
| Binder resin (solid) | resin 1 1.5 | resin 5 1.5 | resin 7 1.5 | resin 7 1.5 |
| Toluene | 13.5 | 16.4 | 21.75 | 18.5 |
| MEK | 13.5 | 10.6 | 10.25 | 18.5 |
| Cyclohexanone | 10 | 10 | 5 | 0 |
| Glass beads | 50 | 50 | 50 | 50 |
| properties of the magnetic paint | 28 | 25 | 30 | 36 |
| Adsorption ratio of the binder % | | | | |

TABLE 11-continued

|  | Comparative Example 14 | Comparative Example 15 | Comparative Example 16 | Comparative Example 17 |
|---|---|---|---|---|
| properties of the magnetic layer | | | | |
| Gloss | 85 | 80 | 80 | 115 |
| Square ratio | 0.75 | 0.73 | 0.71 | 0.78 |
| Packing density % | 35 | 36 | 37 | 30 |
| Durability | | | | |
| running at 10° C. | x | x | x | Δ |
| running at 40° C. | x | x | x | Δ |

TABLE 12

|  | Comparative Example 18 | Comparative Example 19 | Comparative Example 20 | Comparative Example 21 |
|---|---|---|---|---|
| Composition of the magnetic paint (parts by weight) | | | | |
| Magnetic powder | 12 | 12 | 12 | 12 |
| Binder resin (solid) | resin 2 1.5 resin 3 1.5 | resin 8 1.5 resin 2 1.5 | resin 8 1.5 resin 4 1.5 | resin 8 1.5 resin 9 1.5 |
| Toluene | 18.5 | 14.75 | 14.75 | 14.75 |
| MEK | 18.5 | 12.25 | 12.25 | 12.25 |
| Cyclohexanone | 0 | 10 | 10 | 10 |
| Glass beads | 50 | 50 | 50 | 50 |
| properties of the magnetic paint | | | | |
| Adsorption ratio of the binder % | 42 | 50 | 38 | 44 |
| properties of the magnetic layer | | | | |
| Gloss | 125 | 125 | 120 | 125 |
| Square ratio | 0.83 | 0.81 | 0.81 | 0.82 |
| Packing density % | 22 | 23 | 26 | 24 |
| Durability | | | | |
| running at 10° C. | ○ | ○ | ○ | ○ |
| running at 40° C. | ○~Δ | ○~Δ | ○~Δ | ○~Δ |

Since the magnetic paint of the present invention is prepared by a method taking advantage of a poor solvent and a good solvent of the binder, the dispersibility of the magnetic particles and the flowability of the magnetic paint are excellent. A magnetic layer of a magnetic recording medium prepared from such a magnetic paint is improved in terms of its characteristics such as smoothness of the surface there-of.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic paint comprising magnetic powder, a binder and organic solvents, the magnetic paint being prepared by first dispersing the magnetic powder and an amount of the binder in the range from about 20% to about 80% by weight based on the weight of the total binder in a poor solvent of the binder so as to obtain a first dispersion, adding a good solvent of the binder and the rest of the binder into the first dispersion, and then dispersing the mixture so as to obtain a second dispersion, wherein the binder and the solvent of the binder for the first dispersion and the second dispersion are selected so as to satisfy the following equation (1):

$$R_1/R_2 > 1.2 \qquad (1)$$

where $R_1$ represents a weight of the binder adsorbed to 1 g of the magnetic powder, when the magnetic powder, in an amount four times the solid weight of the binder, is dispersed in a solution in which the binder for the first dispersion is dissolved in a solvent for the first dispersion at 7.5% by weight concentration; and $R_2$ represents a weight of the binder adsorbed to 1 g of the magnetic powder, when the magnetic powder, in an amount four times the solid weight of the binder, is dispersed in a solution in which the binder for the second dispersion is dissolved in a solvent for the second dispersion at 7.5% by weight concentration.

2. A magnetic recording medium comprising a substrate and a magnetic layer, the magnetic layer being prepared front the magnetic paint of claim 1.

3. A magnetic paint comprising magnetic powder, a binder and organic solvents, the magnetic paint being prepared by first dispersing the magnetic powder and an amount of the binder in the range from about 20% to about 80% by weight based on the weight of the total binder in a poor solvent of the binder so as to obtain a first dispersion, adding a good solvent of the binder and the rest of the binder into the first dispersion, and then dispersing the mixture so as to obtain a second dispersion, about 25% by weight or more of the binder based on the weight of the total binder being adsorbed to the magnetic powder, wherein the binder and the solvent of the binder for the first dispersion and the second dispersion are selected so as to satisfy the following equation (1):

$$R_1/R_2 > 1.2 \qquad (1)$$

where $R_1$ represents a weight of the binder adsorbed to 1 g of the magnetic powder, when the magnetic powder, in an amount four times the solid weight of the binder, is dispersed in a solution in which the binder for the first dispersion is dissolved in a solvent for the first dispersion at 7.5% by weight concentration; and $R_2$ represents a weight of the binder adsorbed to 1 g of the magnetic powder, when the magnetic powder, in an amount four times the solid weight of the binder, is dispersed in a solution in which the binder for the second dispersion is dissolved in a solvent for the second dispersion at 7.5% by weight concentration.

4. A magnetic recording medium comprising a substrate and a magnetic layer, the magnetic layer being prepared from the magnetic paint of claim 3.

* * * * *

UNITED STATES PATENT AND TRADEMARK OFFICE
CERTIFICATE OF CORRECTION

PATENT NO. : 5,750,248
DATED : May 12, 1998
INVENTOR(S) : YATSUKA

It is certified that error appears in the above-indentified patent and that said Letters Patent is hereby corrected as shown below:

Column 16, Table 10, Comparative Example 13, line 13: "3.86" should read --3.85--.
Column 16, Table 11, Comparative Example 14, line 58: insert --resin 5 1.5--.
Column 16, Table 11, Comparative Example 15, line 58: insert --resin 6 1.5--.
Column 16, Table 11, Comparative Example 16, line 58: insert --resin 6 1.5--.
Column 16, Table 11, Comparative Example 17, line 58: insert --resin 2 1.5--.

Signed and Sealed this

Twenty-fifth Day of August, 1998

*Attest:*

BRUCE LEHMAN

*Attesting Officer*  *Commissioner of Patents and Trademarks*